United States Patent
Higashi

(10) Patent No.: US 7,933,465 B2
(45) Date of Patent: Apr. 26, 2011

(54) PROCESSING DATA SUPPLY METHOD AND IMAGE PROCESSING APPARATUS

(75) Inventor: Fuminori Higashi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 895 days.

(21) Appl. No.: 11/898,458

(22) Filed: Sep. 12, 2007

(65) Prior Publication Data

US 2008/0069465 A1 Mar. 20, 2008

(30) Foreign Application Priority Data

Sep. 15, 2006 (JP) .................................. 2006-251044

(51) Int. Cl.
 *G06K 9/36* (2006.01)
(52) U.S. Cl. ......................................... 382/260; 382/247
(58) Field of Classification Search .................. 382/232, 382/247
See application file for complete search history.

(56) References Cited

U.S. PATENT DOCUMENTS

| | | | | |
|---|---|---|---|---|
| 5,710,638 | A * | 1/1998 | Yamamoto et al. | 358/404 |
| 5,835,691 | A * | 11/1998 | Matsunoshita | 358/1.17 |
| 6,122,708 | A * | 9/2000 | Faraboschi et al. | 711/118 |
| 6,490,053 | B1 * | 12/2002 | Takahashi et al. | 358/1.18 |
| 7,234,022 | B2 * | 6/2007 | Chong, Jr. | 711/113 |

FOREIGN PATENT DOCUMENTS

JP 2000-251065 9/2000

* cited by examiner

*Primary Examiner* — Jingge Wu
*Assistant Examiner* — Stephen R Koziol
(74) *Attorney, Agent, or Firm* — McGinn IP Law Group, PLLC

(57) ABSTRACT

When performing arithmetic processing on unprocessed image data with use of a target pixel and reference pixels in its proximity, buffers of a number corresponding to the number of lines required for the arithmetic processing, which are a first buffer and a second buffer, are used as intermediate storage units. Each buffer has a capacity that is smaller than a size of a line of the unprocessed image data and equal to or larger than a size required for the arithmetic processing in a main scanning direction. In each arithmetic processing, a pixel from each line in the unprocessed image data is input one by one to a storage region at the right end of a corresponding buffer, and a pixel is read and output from each position of each buffer that is determined according to a positional relationship between a target pixel and its reference pixel. Each time arithmetic processing is performed in each line, data is shifted one pixel from the right end to the left end in the first buffer and the second buffer.

20 Claims, 15 Drawing Sheets

| MEMORY ACCESS | 1 | 2 | 3 | 4 |
|---|---|---|---|---|
| READ UNPROCESSED DATA w0 (FROM MEMORY TO STORE UNPROCESSED DATA) | O | | | |
| READ PROCESSED DATA w1 (FROM MEMORY TO STORE PROCESSED DATA) | O | | | |
| WRITE PROCESSED DATA w2 (TO MEMORY TO STORE PROCESSED DATA) | | O | | |

Fig. 16

RELATED ART

| MEMORY ACCESS | 1 | 2 | 3 | 4 |
|---|---|---|---|---|
| READ UNPROCESSED DATA (FROM MEMORY TO STORE UNPROCESSED DATA) | ○ | | | |
| READ PROCESSED DATA (FROM MEMORY TO STORE PROCESSED DATA) | ○ | ○ | ○ | |
| WRITE PROCESSED DATA (TO MEMORY TO STORE PROCESSED DATA) | | | | ○ |

PROCESSING DATA SUPPLY METHOD AND IMAGE PROCESSING APPARATUS

BACKGROUND OF THE INVENTION

1. Field of the Invention

The present invention relates to a data supply method in the processing of image data, and an image processing technique using the data supply method.

2. Description of Related Art

In digital copy machines and printers, image processing such as smoothing, scaling and edge enhancement is performed on input images that are obtained by a scanner or the like before outputting the images. Such image processing is also performed on images to be used on the World Wide Web (WWW) and images to be used in AV equipment such as TV and DVD. Existing image processing apparatus that perform such image processing include a line memory that serves as an intermediate storage unit, and carries out processing by temporarily storing an input image stored in a page memory in line-by-line fashion into the line memory.

The number of line memories that are included in such an image processing apparatus differs depending on the position of the pixels that are necessary for image processing. For example, performing the 3×3 filtering on an input image requires two line memories: one for storing data of a second previous line (data of each line is referred to hereinafter simply as line data) and one for immediately previous line data. An image processing apparatus carries out the filtering with the use of present line data and line data that are stored in the two line memories. As the size of the filter is larger, the number of necessary line memories increases.

Recently, the resolution and the filter size are on the increase in order to provide a better image quality. Accordingly, the capacity of one line memory and the number of line memories are also ever increasing.

Japanese Unexamined Patent Application Publication No. 2000-251065 (Yamada) discloses an image processing apparatus that aims at suppressing an increase in the capacity of a line memory. FIG. 19 (which corresponds to FIG. 1 in Yamada) shows the configuration of an image processing apparatus 10 that is disclosed therein. The image processing apparatus 10 includes a page memory 12, a segment read unit 14, an image processing ASIC 18, and a line reconstruction unit 20. The image processing ASIC 18 includes a segment memory 22, a segment memory 24, and an image processing unit 26.

The segment read unit 14 divides the page memory 12 into a plurality (nine in the example of FIG. 19) of blocks, and reads data in block-by-block fashion. Specifically, the segment read unit 14 reads data in the main scanning direction (in the direction of the arrow A in FIG. 19) and outputs data of one line (segment) in one block (which is segment data; e.g. the portion C in FIG. 19) to the image processing ASIC 18. The segment read unit 14 repeats the reading in the same block in units of segments in the sub scanning direction (in the direction of the arrow B in FIG. 19), and, after finishing the reading of one block, it then proceeds to read the next block.

The image processing unit 26 in the image processing ASIC 18 performs the 3×3 filtering, for example, on the segment data from the segment read unit 14. In addition to the segment data from the segment read unit 14, the segment data that are stored in the segment memory 22 and the segment memory 24 are supplied to the image processing unit 26.

The segment data that is output from the segment read unit 14 is supplied to the segment memory 22, and the segment data that is output from the segment memory 22 is supplied to the segment memory 24. Because the segment memory 22 and the segment memory 24 are FIFO (First-In First-Out) memories, the second previous segment data is stored in the segment memory 24, and the previous segment data is stored in the segment memory 22.

In this manner, the image processing unit 26 receives the same number of pieces of segment data as the pixels necessary for the 3×3 filtering in the sub scanning direction, which is three. Because the filtered segment data is in the order of blocks that is the same as the order of reading by the segment read unit 14, it is necessary to reconstruct the line data by the line reconstruction unit 20.

The segment read unit 14 has an pixel overlap read function, and, if a peripheral pixel to be referred to (which is referred to hereinafter as a reference pixel) of a target pixel on which filtering is performed is located in an adjacent block, it reads the pixel that is located in the adjacent block (overlap pixel) and supplies it to the image processing unit 26. For example, as shown in (a) of FIG. 20, if a target pixel (indicated by a black circle) is located at the right end of the block 1, the three pixels at the right side of its reference pixels (white circles within the dotted-line frame) are located in the adjacent block 2. Likewise, as shown in (b) of FIG. 20, if a target pixel is located at the left end of the block 2, the three pixels at the left side of its reference pixels are located in the adjacent block 1. With the pixel overlap read function, the segment read unit 14 can read reference pixels and supply them to the image processing ASIC 18 even when a target pixel and reference pixels are located in different blocks. Although FIG. 20 shows the example where reference pixels are located in another block that is adjacent to the block having a target block in the main scanning direction, this is the same for the case where reference pixels are located in another block that is adjacent to the block having a target block in the sub scanning direction.

As described above, though a line memory of the existing image processing apparatus needs to have a capacity to store data of one line of an input image, the segment memory 22 and the segment memory 24 of the image processing apparatus 10 only need to have a capacity to store data of one segment, thus enabling reduction of the capacity of line memories.

The number of overlap pixels in one block is as follows. In FIG. 21, the pixels within the dotted-line frame correspond to the data that need to be read to process data of one block in the 3×3 filtering. As shown in FIG. 21, the segment read unit 14 needs to read all the pixels on the outer edge of the block 2, which are indicated by black circles, in order to process the data of the block 2.

In the example of FIGS. 20 and 21, reference pixels are adjacent to a target pixel. However, depending on the type of filtering, there can be a reference pixel that is away from a target pixel by n number (n is a natural number of two or above) of pixels. For example, as shown in FIG. 22, a pixel at the lower right end of the pixels within the dotted-line frame is a target pixel, and data necessary for arithmetic processing is the data of the pixels indicated by black circles, which are, the target pixel, a pixel that is in the same line as the target pixel and away from the target pixel by three pixels in the direction opposite to the main scanning direction, a pixel that is in the previous line of the target pixel and at the same position as the target pixel in the main scanning direction, and a target that is in the previous line of the target pixel and away from the target pixel by three pixels in the direction opposite to the main scanning direction. In such arithmetic processing, in order to process the data of the block 2, the segment read unit 14 needs to read not only the pixels in the block 2 but also all the pixels indicated by black circles which are outside the pixel 2 as shown in FIG. 23. This leads to an increase in the circuit size of a section to implement the pixel overlap read function.

Further, the segment read unit 14 needs to perform address calculation for reading overlap pixels, which also causes an increase in the circuit size.

Furthermore, when the image processing apparatus 10 outputs the data that is processed in units of blocks, it is necessary to reconstruct the data in units of lines. The image processing apparatus 10 includes the line reconstruction unit 20 for this purpose, which also causes an increase in the circuit size.

SUMMARY

According to one aspect of the present invention, there is provided a processing data supply method. When performing arithmetic processing on unprocessed image data composed of a plurality of lines, each line containing a plurality of pieces of unit data of a prescribed size arranged sequentially in a main scanning direction, with use of target unit data and reference unit data located in close proximity to the target unit data, the method places intermediate storage units of a number corresponding to the number of lines required for arithmetic processing. Each intermediate storage unit includes a plurality of storage regions having the same size as each unit data that are arranged sequentially from one end to another end, and has a capacity that is smaller than a size of a line of unprocessed image data and equal to or larger than a size required for arithmetic processing in the main scanning direction.

The method then performs, in each arithmetic processing, an input process of inputting unit data one piece by one piece from each line of the unprocessed image data to a storage region at the one end as an input end of an intermediate storage unit corresponding to the line, and an output process of reading unit data stored in a storage region at each position that is determined according to a positional relationship between target unit data and reference unit data of the target unit data from each intermediate storage unit and supplying the unit data for the arithmetic processing.

Further, each time arithmetic processing is performed in each line, the method performs data shifting of the intermediate storage unit by one storage region from one end to the other end.

According to another aspect of the present invention, there is also provided a processing data supply method. The arithmetic processing in this method uses processed data of unit data that is located before target unit data in a scanning order and in close proximity to the target unit data as reference unit data, and a difference from the above-described processing data supply method is described hereinafter. In this aspect, the input process includes reading one piece of target unit data from a first memory to store unprocessed image data and inputting the target unit data to a storage region at an input end of a prescribed intermediate storage unit, and reading processed data in a line containing unit data required for the arithmetic processing and being different from a line containing the target unit data one piece by one piece from a second memory to store processed data and inputting the processed data to a storage region at an input end of an intermediate storage unit corresponding to the line and being different from the prescribed intermediate storage unit. Further, each time arithmetic processing is finished, the method inputs processed data as a result of the arithmetic processing to a storage region adjacent to the storage region at the input end of the prescribed intermediate storage unit after the data shifting of the intermediate storage unit is performed.

One that substitutes the above method for a system or a program, and one that applies the above method to an image processing apparatus are also effective as other aspects of the present invention.

The technique of the present invention enables reduction of the capacity of an intermediate storage unit and suppression of an increase in circuit size when performing image processing on input images.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 16 is a view to describe memory access in the image processing apparatus shown in FIG. 9;

FIG. 18 is a view to describe memory access in the image processing apparatus shown in FIG. 17;

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Exemplary embodiments of the present invention are described hereinafter with reference to the drawings.

Figure 1:
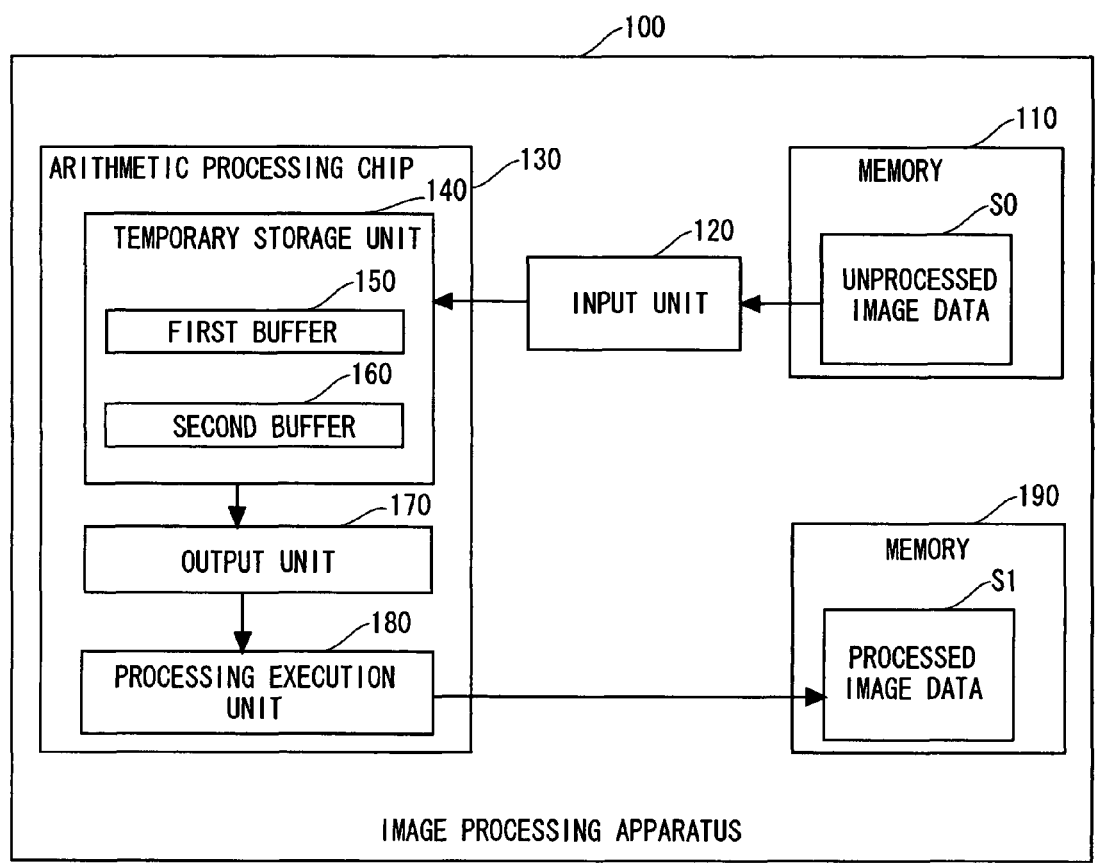
FIG. 1 is a block diagram showing the configuration of an image processing apparatus according to a first embodiment of the present invention.

FIG. 1 shows the configuration of an image processing apparatus 100 according to a first embodiment of the present invention. The image processing apparatus 100 includes a memory 110 to store unprocessed image data (unprocessed image data S0) for each page, an arithmetic processing chip 130 to perform arithmetic processing, which is described later, on the unprocessed image data S0 that is stored in the memory 110, an input unit 120 to read data from the memory 110 and inputs it to the arithmetic processing chip 130 for arithmetic processing, and a memory 190 to store processed image data S1 that is obtained by the arithmetic processing chip 130.

The arithmetic processing chip 130 includes a temporary storage unit 140 to temporarily store the image data that is input by the input unit 120, a processing execution unit 180 to execute arithmetic processing, and an output unit 170 to read data from the temporary storage unit 140 and outputs it to the processing execution unit 180. The temporary storage unit 140 is composed of a first buffer 150 and a second buffer 160. The first buffer 150 and the second buffer 160 serve as intermediate storage units.

The arithmetic processing that is performed by the processing execution unit 180 is described hereinbelow. The image processing apparatus 100 carries out the filtering for enhancing the compression efficiency when performing PNG (Portable Network Graphics) compression, which is one of the image format standards. The filtering uses four pixels as shown in FIG. 2.

Figure 2:
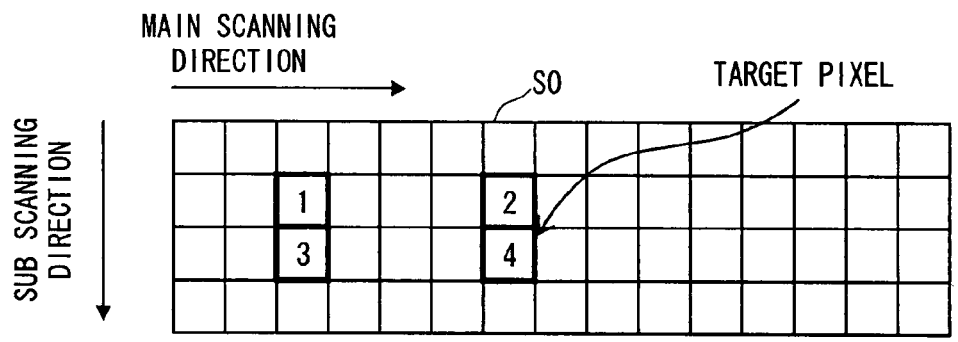
FIG. 2 is a view showing a relationship of a target pixel and reference pixels used by a processing execution unit in the image processing apparatus shown in FIG. 1.

In FIG. 2, one square indicates one pixel. A target pixel is the pixel 4. For the filtering, the pixel 4, the pixel 3 that is away from the pixel 4 by three pixels in the direction opposite to the main scanning direction, the pixel 1 that is immediately above the pixel 3 in the sub scanning direction, and the pixel 2 that is immediately above the pixel 4 in the sub scanning direction are used. If a pixel value is p, the arithmetic processing that is performed by the processing execution unit 180 is expressed by the following expressions 1, 2 and 3:

[Expression 1]

$$f(x)=p(4)-paeth(x) \qquad (1)$$

where p(4) is a pixel value of the pixel 4

[Expression 2]

$$paeth(x) = \begin{cases} p(3) & \text{if } (pa \Leftarrow pb \, \&\& \, pa \Leftarrow pc) \\ p(2) & \text{else if } (pb \Leftarrow pc) \\ p(1) & \text{else} \end{cases} \qquad (2)$$

where p(1) is a pixel value of the pixel 1,
p(2) is a pixel value of the pixel 2,
p(3) is a pixel value of the pixel 3.

[Expression 3]

$$p=p(3)+p(2)-p(1)$$

$$pa=|p-p(3)|$$

$$pb=|p-p(2)|$$

$$pc=|p-p(1)| \qquad (3)$$

where p(1) is a pixel value of the pixel 1,
p(2) is a pixel value of the pixel 2,
p(3) is a pixel value of the pixel 3.

In this embodiment, when the processing execution unit 180 performs the filtering, it requires a target pixel, a pixel that is away from the target pixel by three pixels in the direction opposite to the main scanning direction, a pixel that is immediately above this pixel in the sub scanning direction, and a pixel that is immediately above the target pixel in the sub scanning direction.

Figure 3:
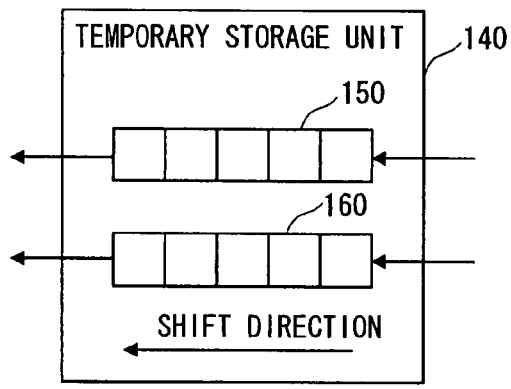
FIG. 3 is a view showing the configuration of a temporally storage unit in the image processing apparatus shown in FIG. 1.

FIG. 3 shows the configuration of the temporary storage unit 140. In the image processing apparatus 100 of this embodiment, the temporary storage unit 140 includes the same number of buffers as the number of lines where pixels that are necessary for one-time arithmetic processing exist, which is two in this example: the first buffer 150 and the second buffer 160. The input unit 120 reads one pixel each from the two adjacent lines of the unprocessed image data S0 that is stored in the memory 110 and inputs them respectively to the two buffers of the temporary storage unit 140.

In the example of FIG. 3, one-pixel data is input from the right side of each buffer and stored in the right-end region of the buffer. Each time the arithmetic processing is performed, the data stored in the buffer is shifted one pixel to the shift direction (which is the direction toward the left in FIG. 3). As a result, the data stored in the left-end region of each buffer is abandoned each time the arithmetic processing is performed. In this manner, one pixel is input from one end of each buffer in one arithmetic processing, and the data in the buffer is shifted to the other end each time the arithmetic processing is performed. For the convenience of description, the end from which data is input is the right end of the buffer, and the shift direction is the leftward direction in the following example.

Each buffer has the capacity that is smaller than the size of a line of the unprocessed image data S0 and equal to or larger than the size required for arithmetic processing in the main scanning direction. The size that is required for arithmetic processing in the main scanning direction is: a distance between the two most distant pixels in one line of the pixels that are required for one-time arithmetic processing plus 2 pixels, which is 5 pixels in this embodiment. If the capacity of a buffer is smaller than the size of a line, the capacity of an intermediate storage unit for arithmetic processing can be reduced. In order to minimize the capacity of a buffer, the capacity of the first buffer 150 and the capacity of the second buffer 160 are both 5 pixels, which is the minimum necessary size, in this embodiment.

The input of data to the buffers, the output of data stored in the buffers to the processing execution unit 180 by the output unit 170, and the data in the buffers are described hereinafter with reference to FIGS. 4 and 5.

Figure 4:
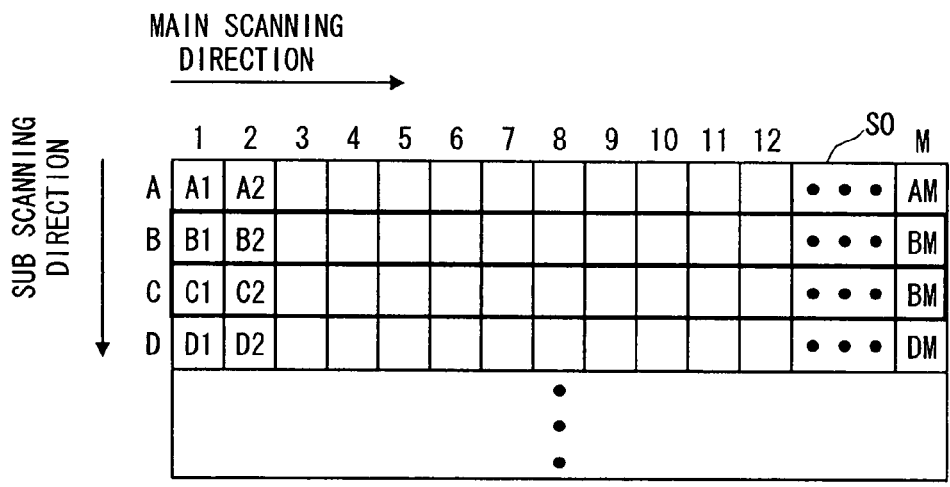
FIG. 4 is a view showing unprocessed image data used in the image processing apparatus shown in FIG. 1.

FIG. 4 is data that is stored in the memory 110. The rows B and C within the heavy-line frame indicate lines that contain the pixels to be processed.

Figure 5:
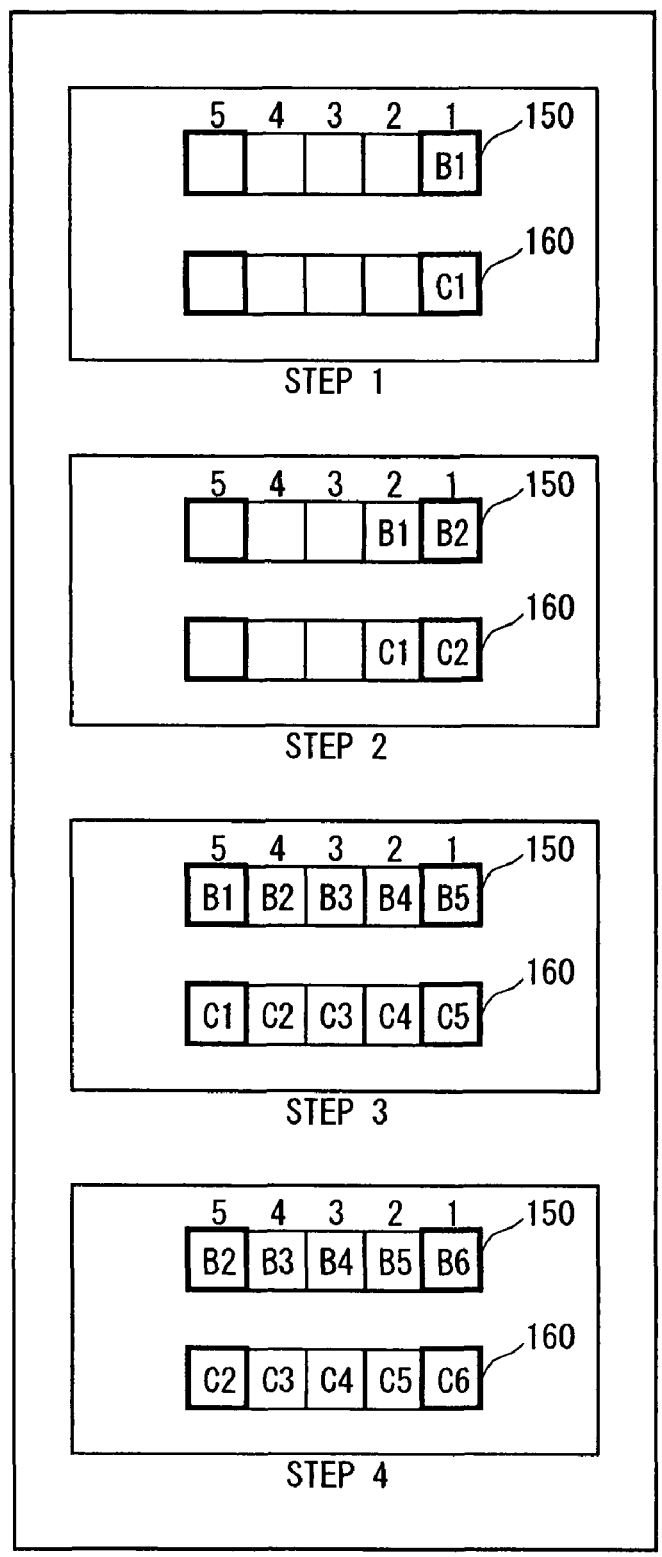
FIG. 5 is a view to describe the operation of an input unit and an output unit in the image processing apparatus shown in FIG. 1.

As shown in Step 1 of FIG. 5, the input unit 120 read the pixels B1 and C1 at the head of the rows B and C, respectively, in the main scanning direction from the memory 110 and stores them into the right-end regions of the first buffer 150 and the second buffer 160. In the following description and drawings, one square of the buffer is a region to store one pixel, and the numbers 1 to 5 are respectively assigned to the squares from the right end to the left end.

The output unit 170 reads the data that are stored in the first buffer 150 and the second buffer 160 and located at the positions that store the pixels necessary for arithmetic processing, and supplies them to the processing execution unit 180. In this embodiment, the data at the right end (the first square) of the second buffer 160 is data of a target pixel, and the output unit 170 operates to read the data of this pixel, the data at the left end (the fifth square) of the second buffer 160, and the data at the left end and the right end of the first buffer 150. In the data storage state of the buffers shown in Step 1 of FIG. 5, the four data are output as p(1)=0, p(2)=B1, p(3)=0, p(4)=C1 by the output unit 170 and supplied to the processing execution unit 180.

The heavy-line frames in FIG. 5 indicate the positions from which the output unit 170 reads data.

After the data are read from the two buffers, the processing execution unit 180 performs arithmetic processing. Concurrently, the two buffers are shifted one pixel to the left. Then, a new pixel is input to the right end of each buffer for the next arithmetic processing. This is shown in Step 2 of FIG. 5.

As shown in Step 2, by the shifting of the buffers and the input of new pixels thereto, data of B1 and B2 are stored in the second square and the first square of the first buffer 150, and data of C1 and C2 are stored in the second square and the first square of the second buffer 160, respectively.

Then, the output unit 170 reads the data that are necessary for arithmetic processing located at the positions indicated by the heavy-line frames from the two buffers in the state of Step 2, and supplies them to the processing execution unit 180. In this case, the four data necessary for arithmetic processing are: p(1)=0, p(2)=B2, p(3)=0, p(4)=C2.

After that, the two buffers are shifted one pixel to the left, and a new pixel is input to the right end of each buffer for the next arithmetic processing.

In this manner, the input of one pixel to each buffer, the shifting of data upon reading for arithmetic processing, the input of one pixel . . . are repeated, and after the fourth time of arithmetic processing, the data of B1 and C1 are respectively stored at the left ends (the squares 5) of the buffers. This is shown in Step 3 of FIG. 5.

In this state, the output unit 170 reads the data necessary for arithmetic processing that are located at the positions indicated by the heavy-line frames and supplies them to the processing execution unit 180. The four data are: p(1)=B1, p(2)=B5, p(3)=C1, p(4)=C5.

After that, the two buffers are shifted one pixel to the left, and a new pixel is input to the right end of each buffer. This is shown in Step 4 of FIG. 5.

As shown in Step 4, by the shifting of the buffers, the data of B1 and C1, which are no longer necessary, are abandoned. For a new target pixel C6, the data of reference pixels B2 and C2 are respectively stored in the squares 5 of the first buffer 150 and the second buffer 160, and the data of a reference pixel B6 is input to the first square of the first buffer 150.

The output unit 170 reads the data necessary for arithmetic processing, which are p(1)=B2, p(2)=B6, p(3)=C2, p(4)=C6, and supplies them to the processing execution unit 180. Then, the buffers are shifted and one pixel is input to each buffer.

The input of a pixel, the reading of data for arithmetic processing, and the shifting of the buffers are repeated in this manner until the end of the lines. After that, the buffers are cleared, and the operation proceeds to the processing of the next lines to be processed (i.e. the rows C and D).

Figure 6:
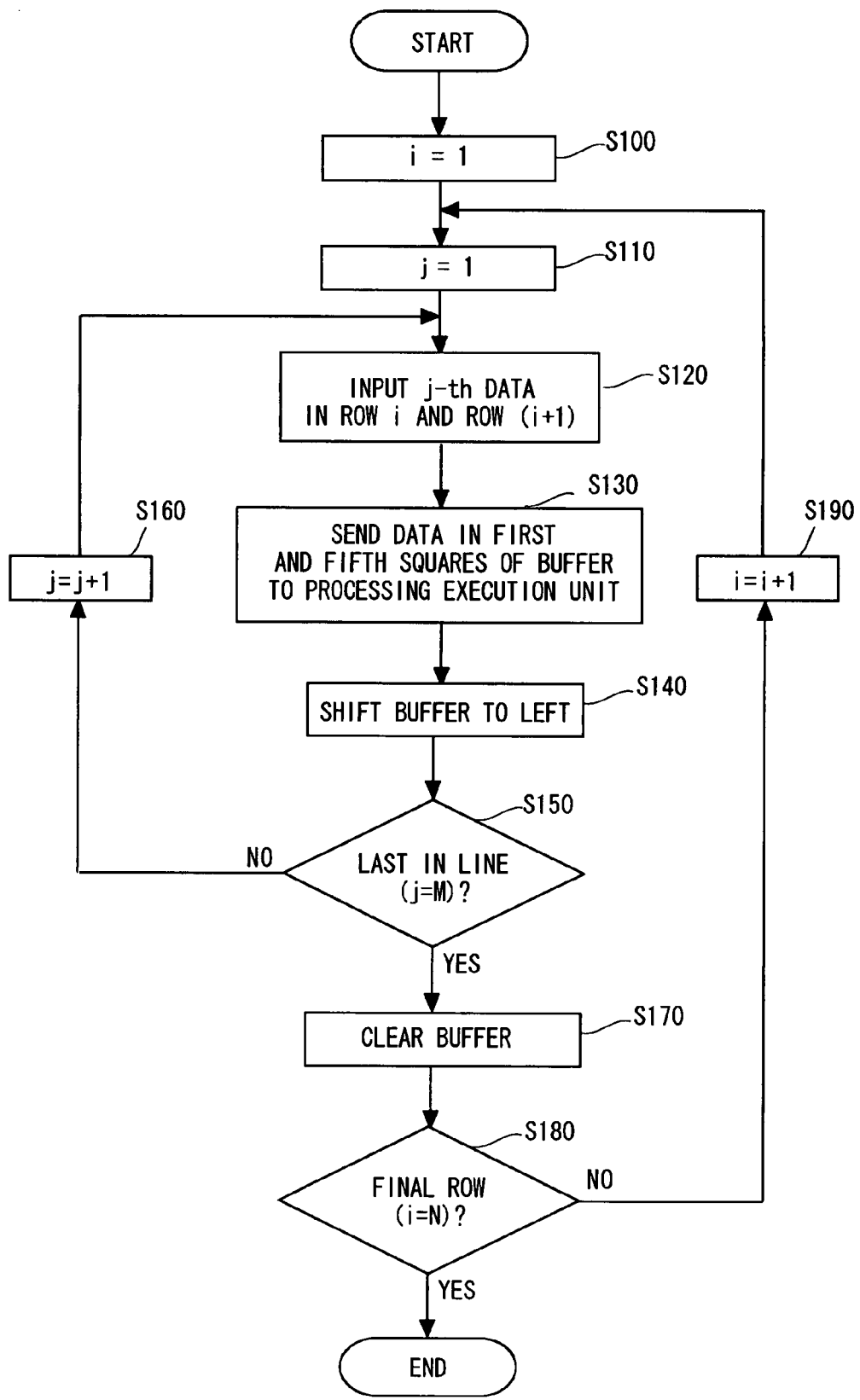
FIG. 6 is a flowchart showing a flow of the processing in the image processing apparatus shown in FIG. 1.

FIG. 6 shows a flowchart of the processing in the image processing apparatus 100 shown in FIG. 1. The size of the unprocessed image data S0 that is stored in the memory 110 is M×N (M is the number of pixels in one line, and N is the total number of lines).

For the arithmetic processing on the image data that is stored in the memory 110, the image processing apparatus 100 first reads the data of the first pixels of the first and second rows in the main scanning direction and inputs them to the first buffer 150 and the second buffer 160 using the input unit 120 (S100, S110, S120). The data of the two pixels are respectively stored into the first squares of the two buffers. The output unit 170 reads the data of the first squares and the fifth squares of the first buffer 150 and the second buffer 160, which are four data pieces in total, and outputs them to the processing execution unit 180 (S130). Concurrently, the two buffers are shifted one square to the left (S140). If the data that is input to the buffer in Step S120 is not a last pixel of the row or line (No in S150), the next pixels in the first and second rows in the main scanning direction are input to the buffers (S160, S120), and the reading of data from the buffers and the shifting of the buffers after the reading are performed (S130, S140). On the other hand, in Step S150, if the data that is input to the buffer in Step S120 is a last pixel of the row (Yes in S150), the two buffers are cleared and prepared for processing of the next row (S170). The processing from Step 110 to Step 170 is performed on all rows (No in S180, S190, and S110-).

The processing execution unit 180 executes the arithmetic processing that is represented by the above expressions 1 to 3 with the use of the data that are output, in sets of four, from the output unit 170, and outputs processing results to the memory 190.

In this manner, the image processing apparatus 100 of this embodiment includes the same number of buffers as the lines that contain the pixels necessary for one-time arithmetic processing, and each buffer has the capacity of 5 pixels in the main scanning direction, which is the minimum necessary size for one-time arithmetic processing. The apparatus then inputs the pixels of the corresponding two lines from the memory 110 one by one to the right ends of the buffers, and reads the data that are stored in the buffers at the positions storing the data necessary for arithmetic processing each time arithmetic processing is performed. Concurrently, the buffers are shifted to the left, so that the data at the left ends of the buffers are abandoned. Thus, in the image processing apparatus 100 of this embodiment, the two buffers store the data that are necessary for one-time arithmetic processing, pixels are sequentially read from the memory and input to the buffers, and when data is read from the buffers for arithmetic processing, the buffers are shifted to the left and new data are input to the buffers. Such data input and reading and buffer shirting are repeated. In this configuration, each buffer in the temporary storage unit 140 does not need to have the capacity to store data of one whole line. It is thereby possible to reduce the capacity of a buffer that serves as an intermediate storage unit even if the amount of data in one line increases.

Further, because the data necessary for one-time arithmetic processing are simultaneously stored in the buffers, there is no need to place another circuit for treating overlap pixels, which is required in the technique taught by Yamada. It is thereby possible to reduce a circuit size in addition to reducing the capacity of an intermediate storage unit. Furthermore, when a pixel which should be referred to for processing a target pixel is away from the target pixel by n number (n is a natural number of 2 or above) of pixels, the circuit size of a section to implement the pixel overlap read function increases according to a technique taught by Yamada described earlier. In the image processing apparatus 100, on the other hand, there is no problem of overlap pixels, and therefore it is possible to suppress an increase in circuit size even when there is a reference pixel that is away from a target pixel.

Furthermore, because the image processing apparatus 100 of this embodiment executes the arithmetic processing sequentially in the order of data in the unprocessed image data S0, there is no need to perform line reconstruction on processed image data. This also contributes to the suppression of an increase in circuit size.

Figure 7:
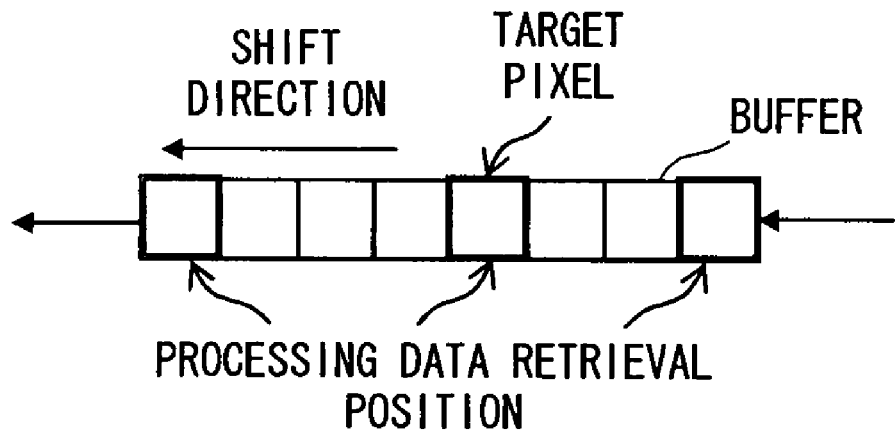
FIG. 7 is a view to describe another case regarding the image processing apparatus shown in FIG. 1.

Although reference pixels that are used in arithmetic processing are located before a target pixel in the main scanning direction as an example in the image processing apparatus 100, the present invention may be applied to the case where reference pixels are located after a target pixel in the main scanning direction or where reference pixels are located both before and after a target pixel in the main scanning direction. FIG. 7 shows the configuration of a buffer, the input of data to the buffer, and the output of data from the buffer in the case where reference pixels are located both before and after a target pixel. For the convenience of description, only one buffer is described hereinbelow.

In this case also, the capacity of a buffer can be smaller than the size of a line and equal to or larger than the size required for arithmetic processing in the main scanning direction. In order to minimize the capacity of a buffer, the buffer having the minimum necessary capacity, which is a size that 2 pixels are added to a distance between the two most distant pixels in one line of the pixels that are required for one-time arithmetic processing, is used. In the example of FIG. 7, there are reference pixels at the positions three pixels before and two pixels after a target pixel, and the "two most distant pixels" are those two reference numerals. Accordingly, the capacity of the buffer is 8 pixels, which is: 6 pixels as a distance between those two reference pixels plus 2 pixels.

Data is input to the right end of the buffer one pixel by one pixel. When retrieving data for arithmetic processing from the buffer, the data are read from the eighth square, the fourth square and the first square from the right end of the buffer. Then, each time arithmetic processing is performed, the buffer is shifted one pixel to the left. In this configuration, the same advantage as the image processing apparatus 100 can be obtained in the apparatus that performs arithmetic processing where reference pixels are located both before and after a target pixel.

In some images to be processed by the image processing apparatus, a distance between a reference pixel and a target pixel varies. In such a case, performing arithmetic processing according to the technique taught by Yamada requires an extremely complicated circuit for the block division depending on a distance, the address calculation for reading overlap pixels, the line reconstruction, and so on. On the other hand, the present invention may be applied to such a case in a simple configuration.

Figure 8:
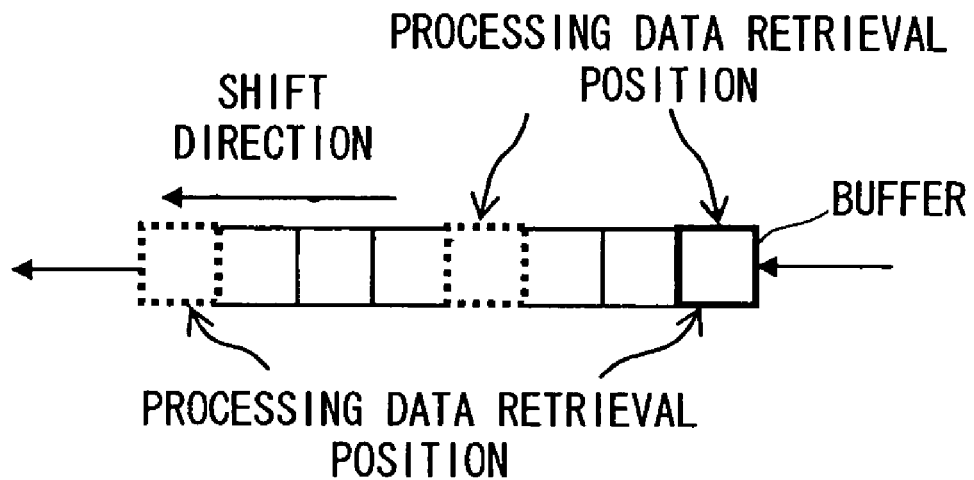
FIG. 8 is a view to describe another case regarding the image processing apparatus shown in FIG. 1.

FIG. 8 shows the configuration of a buffer, the input of data to the buffer, and the output of data from the buffer in the above case. For the convenience of description, only one buffer is described hereinbelow.

In this case also, the capacity of a buffer can be smaller than the size of a line and equal to or larger than the size required for arithmetic processing in the main scanning direction. The minimum necessary capacity is determined based on a maximum value of a possible distance between a reference pixel and a target pixel in the main scanning direction. For example, if a distance between a reference pixel and a target pixel varies between 2 pixels and 6 pixels depending on an image, because the minimum necessary capacity of the buffer is (maximum distance+2) pixels, the capacity of the buffer is 8 pixels based on the maximum value of the distance, which is 6 pixels. In this case also, data is input to the right end of the buffer one pixel by one pixel. When retrieving data for arithmetic processing from the buffer, data is retrieved from the position that is determined according to a distance between a reference pixel and a target pixel which are used for arithmetic processing of that time. For example, if a distance between a reference pixel and a target pixel is 6 pixels, data is retrieved from the left end and the right end of the buffer as shown in FIG. 8. On the other hand, if a distance between a reference pixel and a target pixel is 2 pixels, data is retrieved from the right end and the fourth square from the right end of the buffer, and provided for arithmetic processing. Then, each time arithmetic processing is performed, the buffer is shifted to the left. In this configuration, the same advantage as the image processing apparatus 100 can be obtained in the apparatus that performs arithmetic processing where a distance between a reference pixel and a target pixel varies.

Depending on the type of arithmetic processing, a target pixel and a reference pixel may be retrieved from different memories. The case where arithmetic processing uses the data of a target pixel contained in unprocessed image data and the processed data of a reference pixel located before the target pixel in the scanning order is described hereinbelow as a second embodiment.

Figure 9:
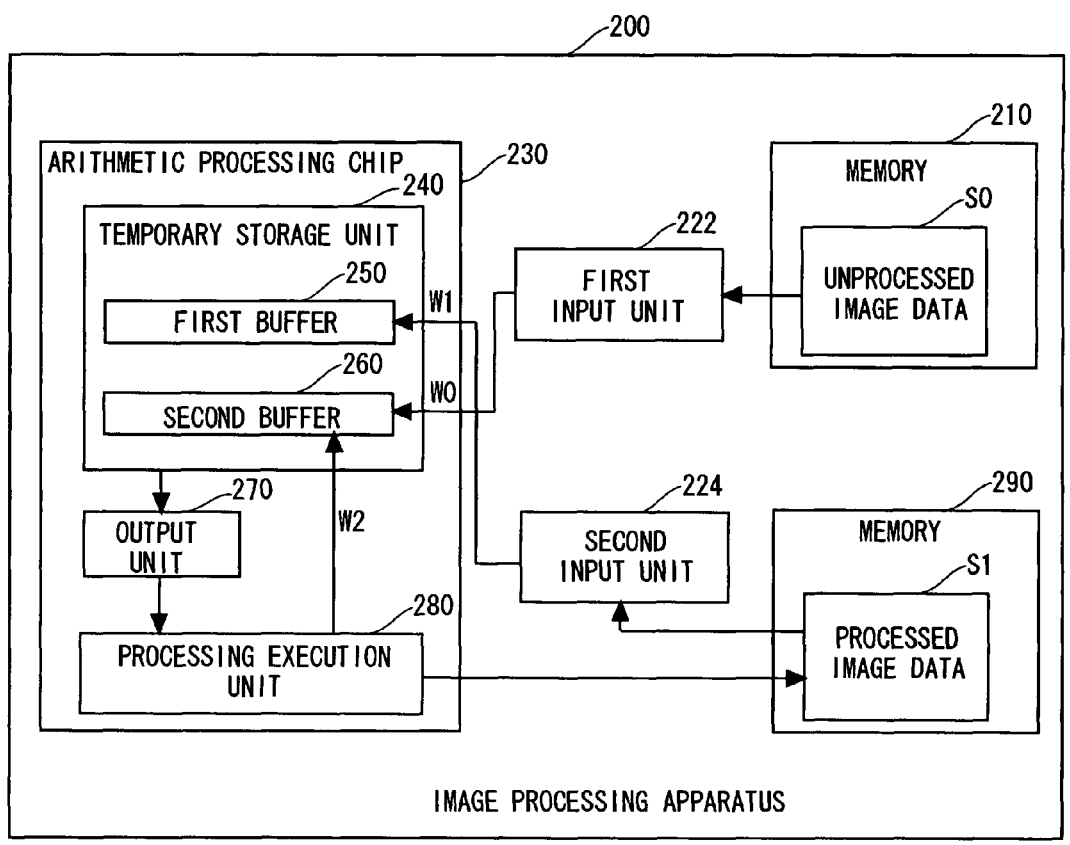
FIG. 9 is a block diagram showing the configuration of an image processing apparatus according to a second embodiment of the present invention.

FIG. 9 shows the configuration of an image processing apparatus 200 according to a second embodiment of the present invention. The image processing apparatus 200 includes a memory 210 to store unprocessed image data (unprocessed image data S0) for each page, an arithmetic processing chip 230 to perform arithmetic processing, which is described later, on the unprocessed image data S0 that is stored in the memory 210, a first input unit 222 to read data w0 from the memory 210 and inputs it to the arithmetic processing chip 230 for arithmetic processing, a second input unit 224 to read data w1 from a memory 290, which is described later, and inputs it to the arithmetic processing chip 230 for arithmetic processing, and the memory 290 to store processing result of the arithmetic processing chip 230 as processed image data S1.

The arithmetic processing chip 230 includes a temporary storage unit 240 to temporarily store the data w0 and the data w1 that are input by the first input unit 222 and the second input unit 224, respectively, a processing execution unit 280 to execute arithmetic processing, and an output unit 270 to read data from the temporary storage unit 240 and outputs it to the processing execution unit 280. Each time the processing execution unit 280 performs arithmetic processing, it outputs processing result to the memory 290 and also to the temporary storage unit 240. The temporary storage unit 240 is composed of a first buffer 250 and a second buffer 260.

Figure 10:
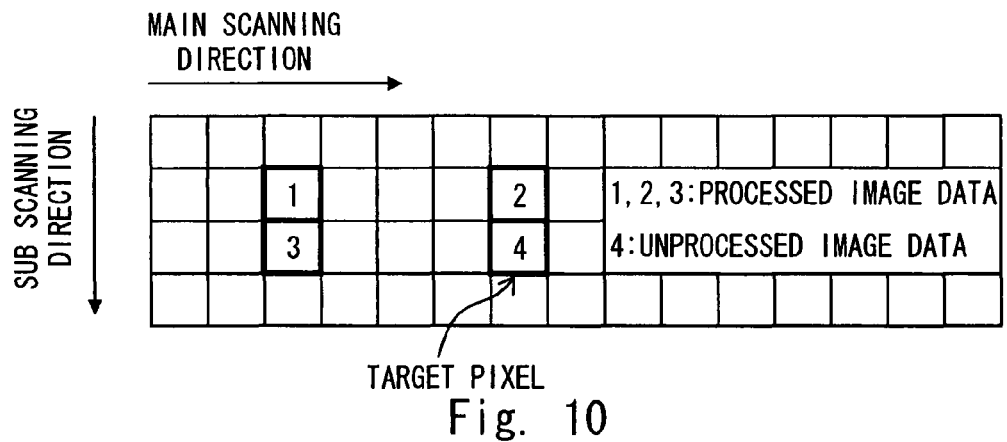
FIG. 10 is a view showing a relationship of a target pixel and a reference pixel used by a processing execution unit in the image processing apparatus shown in FIG. 9.

In this embodiment, the arithmetic processing that is performed by the processing execution unit 280 is the filtering in the PNG decoding, which is the reverse processing to the arithmetic processing that is performed in the image processing apparatus 100. FIG. 10 shows the data used in the processing of the processing execution unit 280.

In FIG. 10, the pixel 4 is a target pixel. The arithmetic processing of this case uses the data of the pixel 4, a pixel (pixel 2) that is located at the same position as the pixel 4 in the main scanning direction and in the line immediately before the pixel 4 in the sub scanning direction, a pixel (pixel 3) that is in the same line as the pixel 4 and located three pixels before the pixel 4 in the main scanning direction, and a pixel (pixel 1) that is located at the same position as the pixel 3 in the main scanning direction and in the line immediately before the pixel 3 in the sub scanning direction. Aside from the pixel 4 which is the target pixel, the data of the pixel 1, the pixel 2 and the pixel 3 are data of processed pixels, which are retrieved from the memory 290.

The configuration of the temporary storage unit 240 and the operation of the first input unit 222, the second input unit 224, the output unit 270 and the processing execution unit 280 are described hereinafter.

Figure 11:
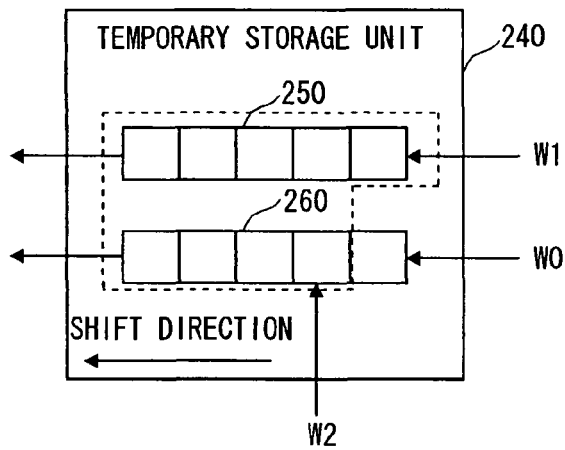
FIG. 11 is a view showing the configuration of a temporally storage unit in the image processing apparatus shown in FIG. 9.

FIG. 11 shows the configuration of the temporary storage unit 240. The temporary storage unit 240 includes the same number of buffers as the number of lines that contain the pixels necessary for one-time arithmetic processing, which is two in this example: the first buffer 250 and the second buffer 260. The capacity of the two buffers and the way of determining the capacity are the same as those for the two buffers in the image processing apparatus 100 and thus not described in detail herein. Processed image data are stored in the region within the dotted-line frame in FIG. 11, and unprocessed data of a target pixel is stored in the region outside the dotted-line frame, which is the right-end region of the second buffer 260. In FIG. 11, one square indicates a region to store one pixel.

The first input unit 222 reads one pixel as data w0 from the memory 210 and inputs it to the second buffer 260 for each arithmetic processing. The data w0 is stored into the right-end square of the second buffer 260. Each time arithmetic processing is performed, the second buffer 260 is shifted one pixel to the left.

The second input unit 224 reads one pixel as data w1 from the memory 290 and inputs it to the first buffer 250 for each arithmetic processing. The data w1 is processed image data of a pixel that is in the line immediately before the data w0 in the sub scanning direction and located at the same position as the data w0 in the main scanning direction. The data w1 is stored into the right-end square of the first buffer 250. Each time arithmetic processing is performed, the first buffer 250 is also shifted one pixel to the left.

Besides the first input unit 222 and the second input unit 224, the processing execution unit 280 also inputs data to the temporary storage unit 240. Each time arithmetic processing is finished, the processing execution unit 280 inputs a processing result or processed data as data w2 to the second square from the right end of the second buffer 260.

The operation of the first input unit 222, the second input unit 224, the temporary storage unit 240, the output unit 270 and the processing execution unit 280 are described hereinafter with reference to FIGS. 12, 13 and 14.

Figure 12:
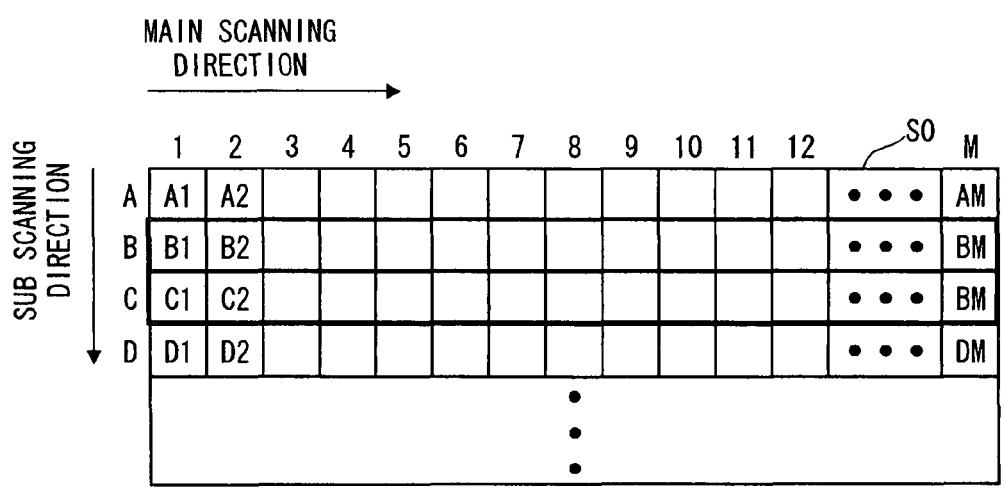
FIG. 12 is a view showing unprocessed image data used in the image processing apparatus shown in FIG. 9.

FIG. 12 shows the unprocessed image data S0 that is stored in the memory 210. The size of the unprocessed image data S0 is M×N (M and N are natural number of 2 or above).

Figure 13:
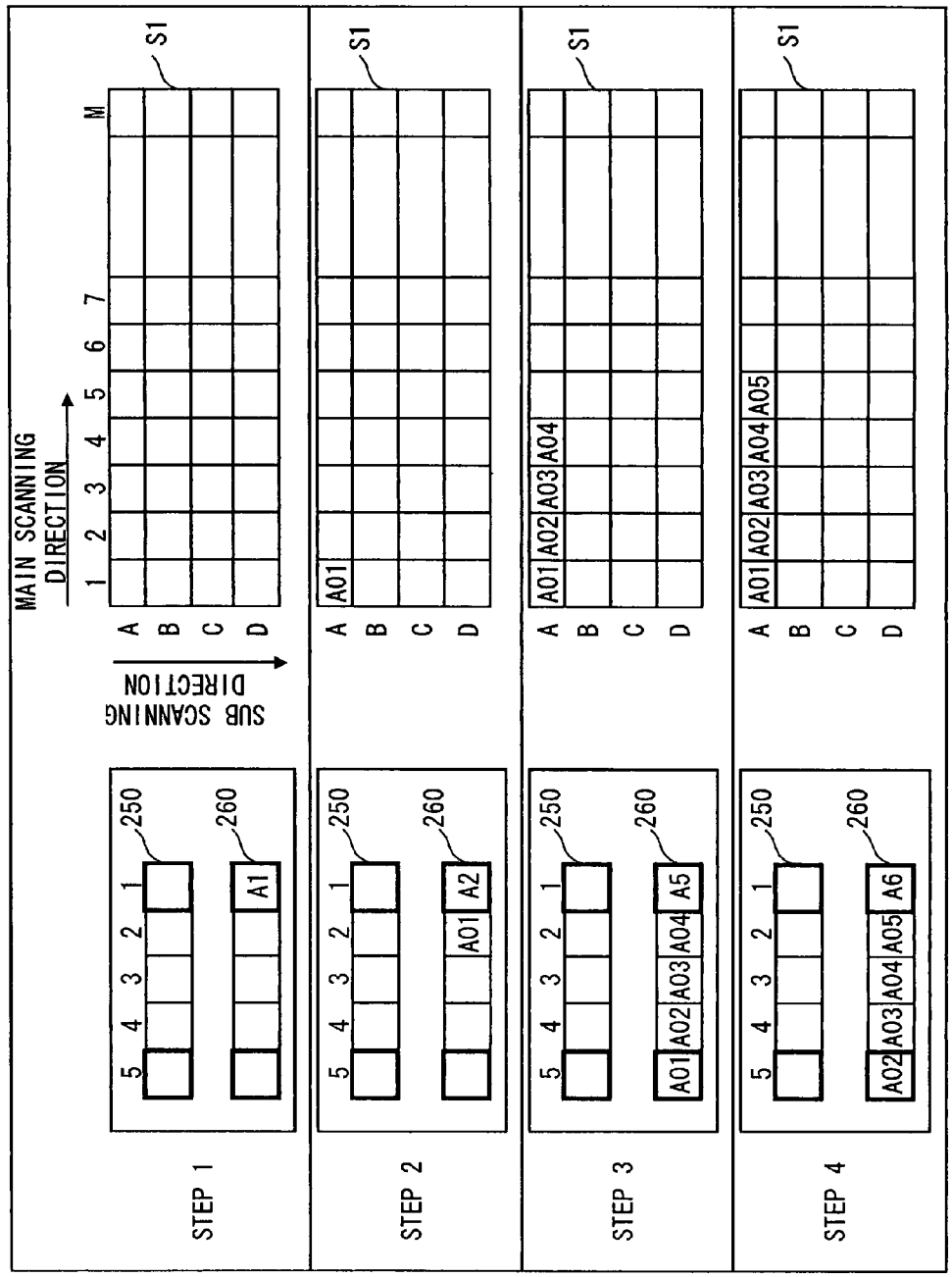
FIG. 13 is a view to describe the operation of a first input unit, a second input unit, and an output unit in the image processing apparatus shown in FIG. 9.

FIG. 13 shows the data stored in the temporary storage unit 240 and the processed image data S1 that is stored in the memory 290 when processing the uppermost line (the row A) of the unprocessed image data S0.

As shown in Step 1 of FIG. 13, the first input unit 222 reads the pixel A1 at the head of the row A of the unprocessed image data S0 from the memory 210, and inputs it to the right end or the first square of the second buffer 260. At this time, there is no processed data stored in the memory 290 for the same page.

The output unit 270 reads the left and right ends, or the fifth and first squares, of the first buffer 250 and the second buffer 260 as data for arithmetic-processing and supplies them to the processing execution unit 280. The value 0 is output for the squares with no data input, which are the fifth squares in this case. Concurrently, the first buffer 250 and the second buffer 260 are shifted one pixel to the left. The processing execution unit 280 performs arithmetic processing using the data supplied from the output unit 270 and outputs processing result as processed data A01 to the memory 290 and further inputs it as data w2 to the second square of the second buffer 260. Then, for the next arithmetic processing, the first input unit 222 inputs the next target pixel A2 from the memory 210 to the first square of the second buffer 260. This state is shown in Step 2 of FIG. 13.

Such processing is repeated in the order of scanning on each pixel of the row A that is stored in the memory 210. In Step S3, a target pixel A5 is stored in the first square of the second buffer 260, and processed data A01 to A04 of pixels A1 to A4 are stored in the fifth to the second squares of the second buffer 260. As a result of the processing of A5 as a target pixel, processed data A02 to A05 of pixels A2 to A5 are stored in the fifth to the second squares of the second buffer 260, and data of the next target pixel A6 is input to the first square of the second buffer 260 as shown in Step 4 of FIG. 13. At this time, A01 to A05 are stored as the processed image data S1 in the memory 290.

Arithmetic processing on the row A proceeds in this manner, and upon completion of the arithmetic processing on the last pixel AM of the row A, the two buffers are cleared. At this time, the processed data A01 to A0M of the row A are stored as the processed image data S1 in the memory 290 as shown in Step 1 of FIG. 14.

Figure 14:
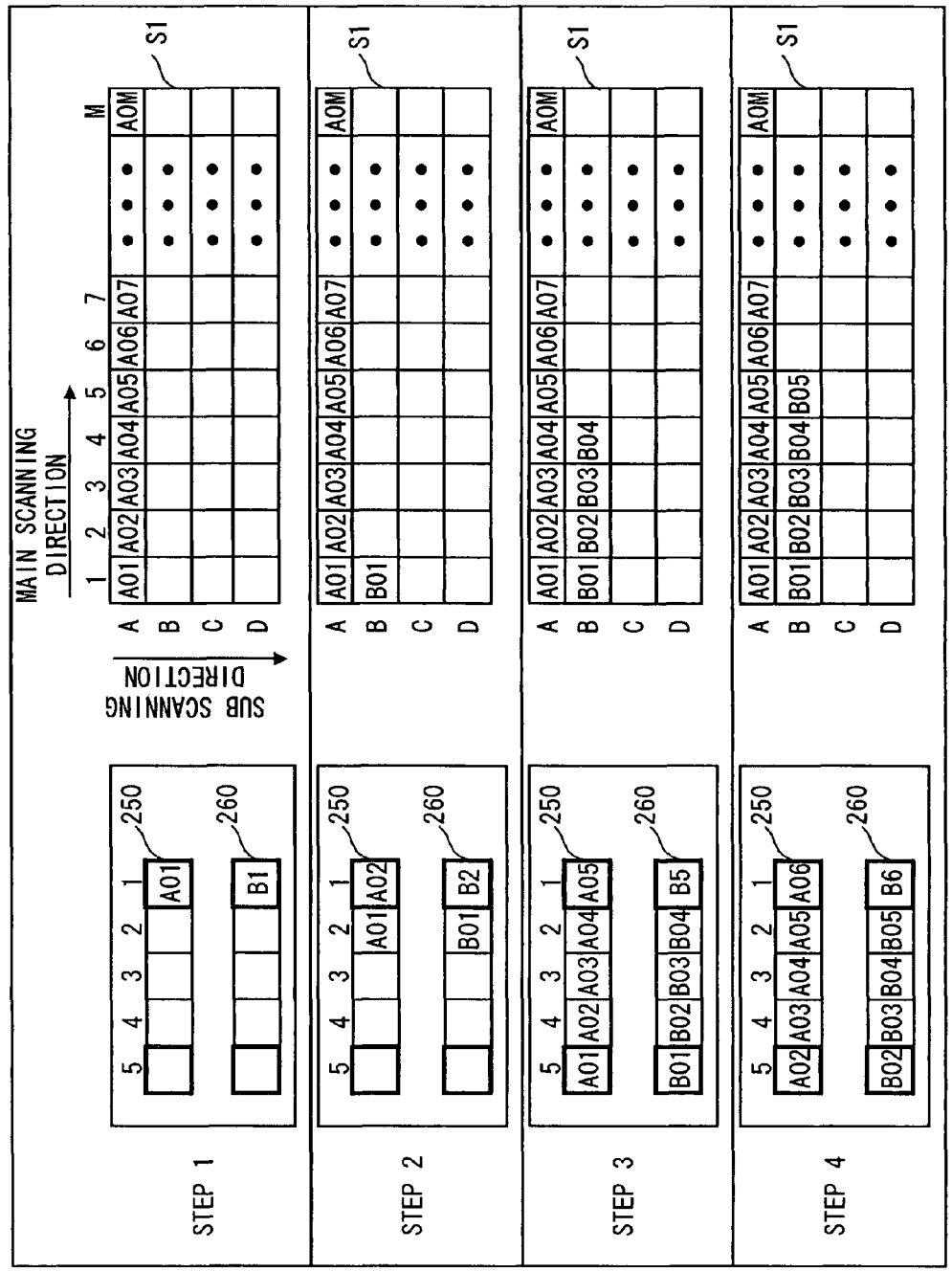
FIG. 14 is a view to describe the operation of a first input unit, a second input unit, and an output unit in the image processing apparatus shown in FIG. 9.

FIG. 14 shows the data stored in the temporary storage unit 240 and the processed image data S1 that is stored in the memory 290 when processing the second line or the row B of the unprocessed image data S0.

As shown in Step 1 of FIG. 14, data are input to the first squares of the two buffers. Specifically, the first input unit 222 inputs the pixel B1 at the head of the row B of the unprocessed image data S0 to the second buffer 260. At the same time, the second input unit 224 inputs the pixel A01 at the head of the row A as processed data of the pixel (A1) at the head of the previous row (the row A) of the row B from the memory 290 to the first buffer 250.

The output unit 270 reads the data of the left-end and the right-end squares of the first buffer 250 and the second buffer 260 as data for arithmetic processing and supplies them to the processing execution unit 280. The value 0 is output for the fifth squares where no data is input. Concurrently, the first buffer 250 and the second buffer 260 are shifted one pixel to the left. The processing execution unit 280 performs arithmetic processing using the data supplied from the output unit 270 and outputs processing result as processed data B01 to the memory 290 and further inputs it to the second square of the second buffer 260. Then, for the next arithmetic processing, the first input unit 222 inputs the next target pixel B2 from the memory 210 to the first square of the second buffer 260, and the second input unit 224 inputs the pixel A02 as processed data of the pixel A2 from the memory 290 to the first square of the first buffer 250. This state is shown in Step 2 of FIG. 14.

In this manner, the input of a target pixel that is read from the memory 210 to the first square of the second buffer 260, the input of processed data of a pixel that is located in the previous line of the target pixel at the same position as the target pixel in the main scanning direction, the arithmetic processing using the first and fifth data of the two buffers, the shifting of the two buffers to the left, and the input of processing result to the second square of the second buffer 260 and to the memory 290 are repeated. In Step 3, the target pixel B5 is input to the first square of the second buffer 260, and processed data B01 to B04 of pixels B1 to B4 are stored in the fifth to the second squares of the second buffer 260. Further, processed data A01 to A05 of pixels A1 to A5 are stored in the fifth to the first squares of the first buffer 250.

As a result of the processing using B5 as a target pixel, processed data B02 to B05 of pixels B2 to B5 are stored in the fifth to the second squares of the second buffer 260, and data of the next target pixel B6 is input to the first square of the second buffer 260 as shown in Step 4 of FIG. 14. At this time, A01 to A0M and B01 to B05 are stored in the memory 290.

Arithmetic processing on the row B proceeds in this manner, and upon completion of the arithmetic processing on the last pixel BM of the row B, the two buffers are cleared.

Such processing is repeated on each row sequentially in the sub scanning direction, so that all data of the unprocessed image data S0 are arithmetically processed.

Figure 15:
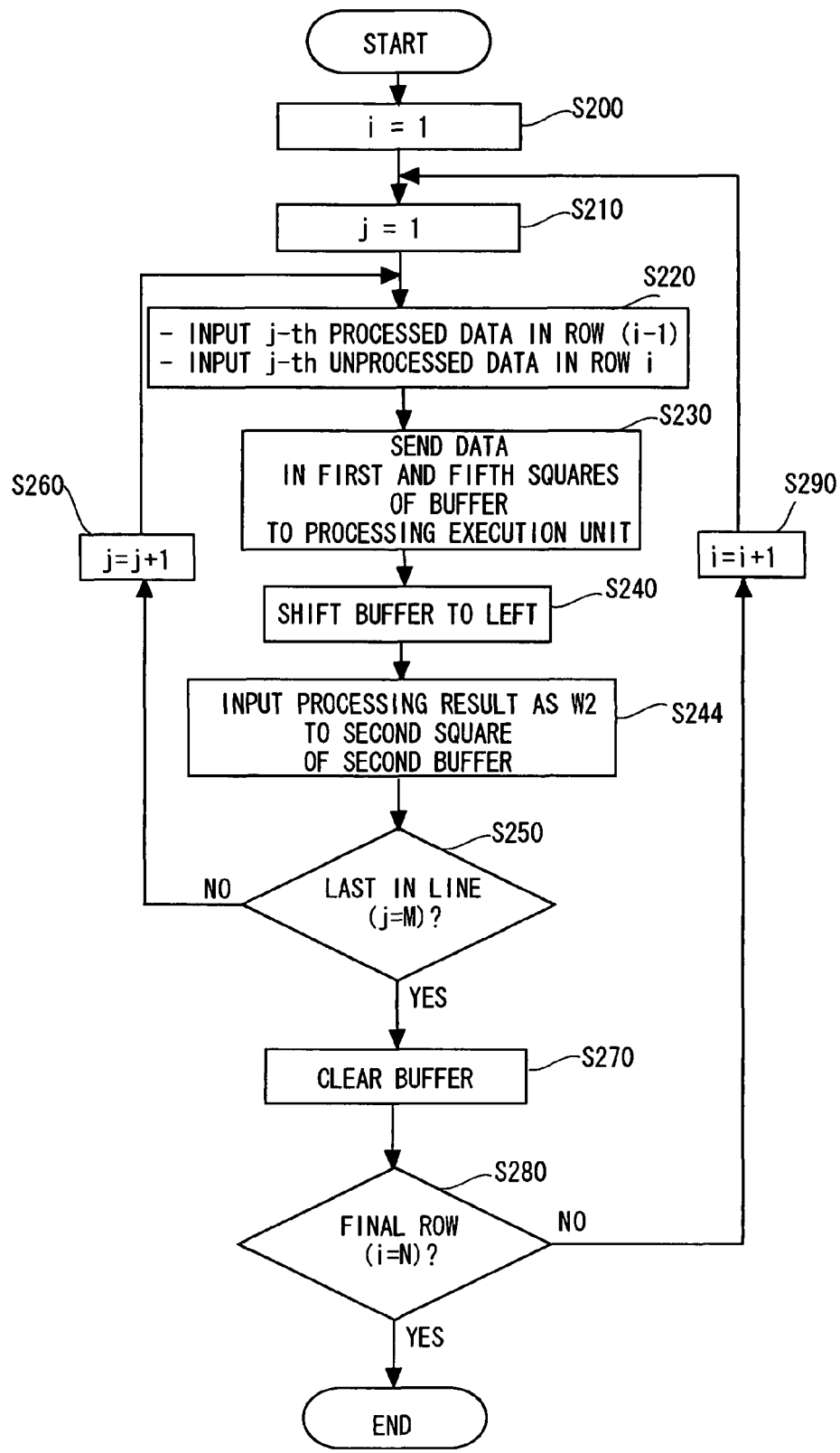
FIG. 15 is a flowchart showing a flow of the processing in the image processing apparatus shown in FIG. 9.

FIG. 15 is a flowchart of the processing in the image processing apparatus 200. When the image processing apparatus 200 performs arithmetic processing on the image data that is stored in the memory 210, the first input unit 222 and the second input unit 224 input one pixel each to the first squares of the second buffer 260 and the first buffer 250, respectively (S200, S210, S220). Specifically, the first input unit 222 reads and inputs data (unprocessed data) w0 of a target pixel from the memory 210, and the second input unit 224 reads and inputs processed data w1 of a pixel in the previous line of the target pixel at the same position as the target pixel in the main scanning direction from the memory 290. If a target pixel is located in the uppermost line (the line A) of the unprocessed image data S0, the second input unit 224 does not input any value or inputs "0" as the data w1 to the first buffer 250.

The output unit 270 reads total four data from the positions from which data used for arithmetic processing is retrieved, which are, the first and the fifth squares of the first buffer 250 and the second buffer 260, and outputs them to the processing execution unit 280 (S230). Concurrently, the two buffers are shifted one square to the left (S240). The processing execution unit 280 performs arithmetic processing and inputs a processing result (processed data of a target pixel) as the data w2 to the second square of the second buffer 260 (S244). The processing execution unit 280 also outputs the processing result to the memory 290. If the data that is input to the second buffer 260 by the first input unit 222 in Step S220 is not a last pixel of the line (No in S250), the processing of Steps S220 to S244 is repeated by setting the next pixel in the same line as the pixel as a target pixel (S260). On the other hand, if the data that is input to the second buffer 260 by the first input unit 222 in Step S220 is a last pixel of the line (Yes in S250), the two buffers are cleared, and then the processing of Steps 210 to S260 is performed sequentially on each pixel of the next line (No in S280, S290, and S210 to S260). Finally, upon completion of the arithmetic processing using the last pixel of the final line as a target pixel (Yes in S280), the processing on the unprocessed image data S0 ends.

As described above, the image processing apparatus 200 enables the suppression of an increase in circuit size and the reduction of the capacity of a buffer that serves as an intermediate storage unit just like the image processing apparatus 100 even when the data used for arithmetic processing includes both of unprocessed image data and processed image data. The memory access during the arithmetic processing in the image processing apparatus 200 is described hereinbelow.

FIG. 16 shows the memory accesses and the number of times of each kind of access that occur during one-time arithmetic processing in the image processing apparatus 200. The circle mark in the table indicates a memory access, and the memory accesses that can be made at the same time are counted as the same time.

As shown in FIG. 16, the image processing apparatus 200 needs to make an access for reading one pixel as the data w0 from the memory 210 that stores unprocessed data, an access for reading one pixel as the data w1 from the memory 290 that stores processed data, and an access for writing processing result, which is the processed data w2, to the memory 290 in each time of arithmetic processing. Because the access for reading the data w0 from the memory 210 and the access for reading the data w1 from the memory 290 can be made at the same time, they are counted as the same time (one time). Thus, the image processing apparatus 200 makes two times of memory accesses in one arithmetic processing.

Figure 17:
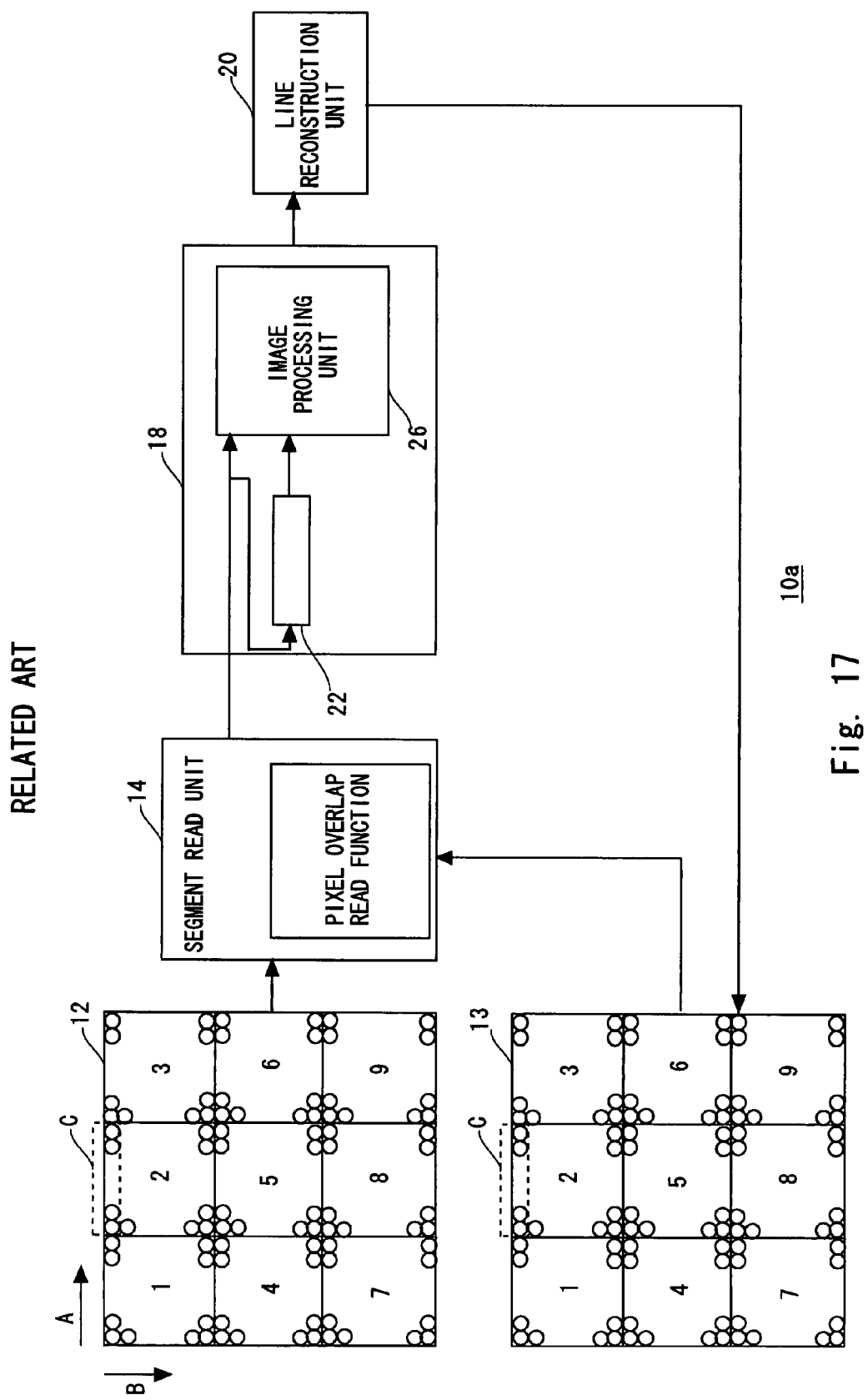
FIG. 17 is a block diagram showing an example of the configuration of an image processing apparatus of a related art.
Figure 19:
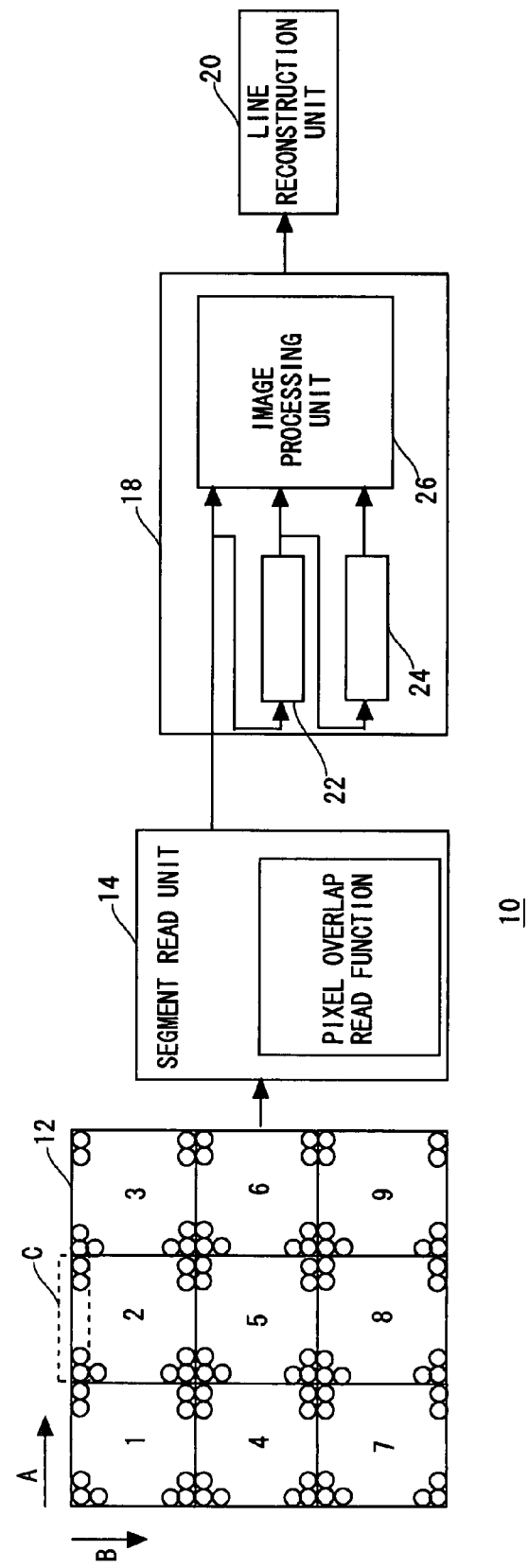
FIG. 19 is a view showing the configuration of an image processing apparatus of a related art.
Figure 20:
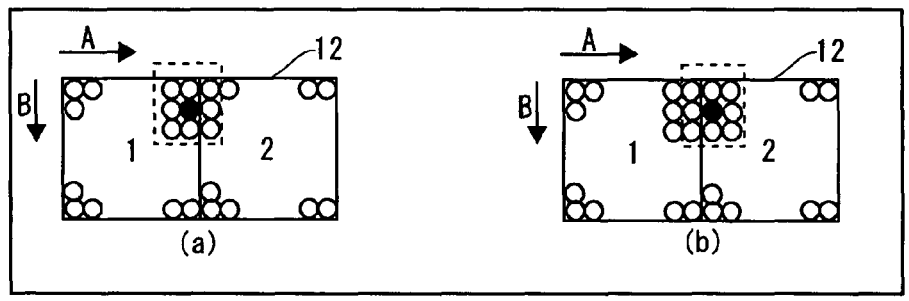
FIG. 20 is a view to describe an pixel overlap read function in the image processing apparatus shown in FIG. 19.
Figure 21:
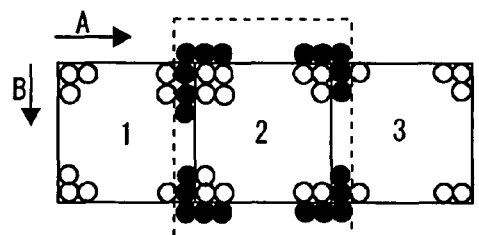
FIG. 21 shows an example of the number of overlap pixels that need to be read in the image processing apparatus shown in FIG. 19.
Figure 22:
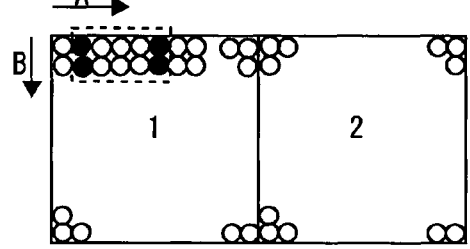
FIG. 22 is a view to describe an example of arithmetic processing.
Figure 23:
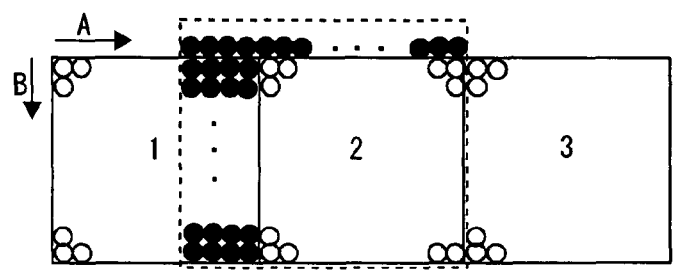
FIG. 23 is a view to describe the number of overlap pixels that need to be read when performing the arithmetic processing shown in FIG. 22 in the image processing apparatus shown in FIG. 19.

The case of performing the arithmetic processing in the image processing apparatus 200 with the use of the technique taught by Yamada is as follows. The apparatus in this case is an image processing apparatus 10a, which may have the configuration shown in FIG. 17. In FIG. 17, the blocks having the same functions as those in the image processing apparatus 10 are denoted by the same reference numerals as in FIG. 19. The processed data after line reconstruction by the line reconstruction unit 20 is stored in a memory 13.

As described earlier, the data required for arithmetic processing are one piece of unprocessed data (data of a target pixel) and three pieces of processed data. Accordingly, the image processing apparatus 10a needs to make one time of access for reading one pixel from the page memory 12 that stores unprocessed data, three times of accesses for reading three pixels from the memory 13 that stores processed data, and one time of access for writing a processing result to the memory 13 for one-time arithmetic processing as shown in FIG. 18. Even though the access for reading from the memory 12 and the first access of the three times of accesses for reading from the memory 13 can be made at the same time and thus counted as the same time (one time), the image processing apparatus 10a makes four times of memory accesses in one arithmetic processing. As the number of times of memory accesses for acquiring data for arithmetic processing is larger, a time required for one-time arithmetic processing is longer. Therefore, the configuration of FIG. 17 fails to perform high-speed processing.

On the other hand, because the image processing apparatus 200 of the second embodiment of the present invention requires only two times of memory accesses for acquiring data in one arithmetic processing, it is possible to perform high-speed processing.

Several embodiments of the present invention are described in the foregoing. The above-described embodiments are provided by way of illustration only, and various changes and modifications may be made without departing from the scope of the present invention. All such changes and modifications as would be obvious to those skilled in the art are intended for inclusion within the scope of the present invention.

For example, although the configuration unit (square) of a buffer is 1 pixel according to the processing unit of the processing execution unit in the above-described embodiments, if the processing unit of image processing is not 1 pixel, the configuration unit according to the processing unit may be used. For example, in the image processing that uses four pieces of 1-byte data, one square may be 1 byte, and a buffer may be shifted one byte each.

Further, in the above-described embodiments, a shift register may be used in stead of a buffer as a temporally storage unit.

The elements that are described as functional blocks to perform various processing in the image processing apparatus 100 and the image processing apparatus 200 according to the embodiments of the present invention may be configured by a processor, a memory and other LSI as hardware, and may be implemented by a program having a reservation control function that is loaded to a memory or the like. It is thus obvious to those skilled in the art that such functional blocks may be implemented in various forms by hardware only, software only, or a combination of those and not limited to one.

For example, in a system that gives a command to a CPU in cooperation with an operating system to a storage medium such as a hard disk device, functional blocks may be configured by installing a computer program for implementing the function of each unit in the image processing apparatus 100 and the image processing apparatus 200 on the hard disk device, performing processing by the CPU according to the program, and cooperating with another hardware configuration.

The processing procedures shown in the flowcharts of FIGS. 6 and 9 are implemented by executing a given program in a CPU. Such a system may be configured not only by a single computer but also by a plurality of computers.

A buffer or a shift register as an intermediate storage unit may be configured as software such as a library.

It is apparent that the present invention is not limited to the above embodiments, but may be modified and changed without departing from the scope and spirit of the invention.

What is claimed is:

1. A processing data supply method when performing an arithmetic processing on unprocessed image data composed of a plurality of lines, each line containing a plurality of pieces of unit data of a prescribed size arranged sequentially in a main scanning direction, with a use of target unit data and reference unit data located in close proximity to the target unit data, as predetermined by the arithmetic processing, the method comprising:

placing intermediate storage units of a number corresponding to a number of lines required for the arithmetic processing, each intermediate storage unit including a plurality of storage regions of the prescribed size arranged sequentially from one end to another end and having a capacity smaller than a size of each line and equal to or larger than a size required for the arithmetic processing in the main scanning direction;

performing, in each arithmetic processing, an input process of inputting unit data one piece by one piece from each line of the unprocessed image data to a storage region at the one end as an input end of an intermediate storage unit corresponding to the line, and an output process of reading unit data stored in a storage region at each position determined according to a positional relationship between target unit data and reference unit data of the target unit data from each intermediate storage unit and supplying the unit data for the arithmetic processing; and performing data shifting of each intermediate storage unit by one storage region from the one end to the other end each time the arithmetic processing is performed in each line.

2. The processing data supply method according to claim 1, wherein the arithmetic processing uses processed data of unit data located before target unit data in a scanning order and in close proximity to the target unit data as reference unit data, wherein the input process includes reading one piece of target unit data from a first memory to store the unprocessed image data and inputting the target unit data to a storage region at an input end of a prescribed intermediate storage unit, and reading processed data in a line containing unit data required for the arithmetic processing and being different from a line containing the target unit data one piece by one piece from a second memory to store the processed data and inputting the processed data to a storage region at an input end of an intermediate storage unit corresponding to the line and being different from the prescribed intermediate storage unit, and wherein the method further comprises, upon each completion of the arithmetic processing, inputting processed data as a result of the arithmetic processing to a storage region adjacent to the storage region at the input end of the prescribed intermediate storage unit after the data shifting of the intermediate storage unit is performed.

3. The processing data supply method according to claim 1, wherein the intermediate storage unit comprises a buffer.

4. The processing data supply method according to claim 2, wherein the intermediate storage unit comprises a buffer.

5. The processing data supply method according to claim 1, wherein the intermediate storage unit comprises a shift register.

6. The processing data supply method according to claim 2, wherein the intermediate storage unit comprises a shift register.

7. The processing data supply method according to claim 1, wherein the unit data comprises data of one pixel.

8. The processing data supply method according to claim 2, wherein the unit data comprises data of one pixel.

9. The processing data supply method according to claim 1, wherein a capacity of each intermediate storage unit is a sum of a distance between two most distant pieces of unit data located in the same line and required for a one-time arithmetic processing, and a double of the prescribed size of unit data.

10. The processing data supply method according to claim 2, wherein a capacity of each intermediate storage unit is a sum of a distance between two most distant pieces of unit data located in the same line and required for a one-time arithmetic processing, and a double of the prescribed size of unit data.

11. An image processing apparatus to perform arithmetic processing on unprocessed image data composed of a plurality of lines, each line containing a plurality of pieces of unit data of a prescribed size arranged sequentially in a main scanning direction, with use of target unit data and reference unit data located in a close proximity to the target unit data, as predetermined by the arithmetic processing, the apparatus comprising:

intermediate storage units of a number corresponding to a number of lines required for arithmetic processing, each intermediate storage unit including a plurality of storage regions of the prescribed size arranged sequentially from one end to another end, having a capacity smaller than a size of each line and equal to or larger than a size required for the arithmetic processing in the main scanning direction, and performing a data shifting by one storage region from the one end to the other end each time arithmetic processing is performed in each line;

a first input unit to input unit data one piece by one piece from each line of the unprocessed image data to a storage region at the one end as an input end of an intermediate storage unit corresponding to a line in each arithmetic processing;

an output unit to read and output unit data stored in a storage region at each position determined according to a positional relationship between the target unit data and the reference unit data of the target unit data from each intermediate storage unit; and a processing execution unit to execute arithmetic processing with a use of unit data output from the output unit.

12. The image processing apparatus according to claim 11, further comprising:

a first memory to store the unprocessed image data;

a second memory to store a processing result of the processing execution unit as processed data; and a second input unit, wherein the processing execution unit uses processed data of unit data located before target unit data in a scanning order and in the close proximity to the target unit data as the reference unit data, wherein the first input unit reads one piece of target unit data from the first memory and inputs the target unit data to a storage region at an input end of a prescribed intermediate storage unit in each arithmetic processing, wherein the second input unit reads processed data in a line containing unit data required for the arithmetic processing and being different from a line containing the target unit data one piece by one piece from the second memory and inputs the processed data to a storage region at an input end of an intermediate storage unit corresponding to the line and being different from the prescribed intermediate storage unit in each arithmetic processing, and wherein, upon each completion of the arithmetic processing, the processing execution unit outputs a processing result to the second memory and inputs the processing result to a storage region adjacent to the storage region at the input end of the prescribed intermediate storage unit after the data shifting of the intermediate storage unit is performed.

13. The image processing apparatus according to claim 11, wherein the intermediate storage unit comprises a buffer.

14. The image processing apparatus according to claim 12, wherein the intermediate storage unit comprises a buffer.

15. The image processing apparatus according to claim 11, wherein the intermediate storage unit comprises a shift register.

16. The image processing apparatus according to claim 12, wherein the intermediate storage unit comprises a shift register.

17. The image processing apparatus according to claim 11, wherein the unit data comprises data of one pixel.

18. The image processing apparatus according to claim 12, wherein the unit data comprises data of one pixel.

19. The image processing apparatus according to claim 11, wherein a capacity of each intermediate storage unit is a sum of a distance between two most distant pieces of unit data located in the same line and required for a one-time arithmetic processing, and a double of the prescribed size of unit data.

20. The image processing apparatus according to claim 12, wherein a capacity of each intermediate storage unit is a sum of a distance between two most distant pieces of unit data located in the same line and required for a one-time arithmetic processing, and a double of the prescribed size of unit data.

* * * * *